US009080004B2

(12) United States Patent
Abrami et al.

(10) Patent No.: US 9,080,004 B2
(45) Date of Patent: Jul. 14, 2015

(54) DIETHYLENE GLYCOL MONOMETHYL ETHER RESISTANT COATING

(75) Inventors: Siamanto Abrami, Glendale, CA (US); Jin Song, Stevenson Ranch, CA (US); Guangliang Tang, Stevenson Ranch, CA (US)

(73) Assignee: PRC-DeSoto International, Inc., Sylmar, CA (US)

( * ) Notice: Subject to any disclaimer, the term of this patent is extended or adjusted under 35 U.S.C. 154(b) by 167 days.

(21) Appl. No.: 12/899,805

(22) Filed: Oct. 7, 2010

(65) Prior Publication Data

US 2012/0088862 A1 Apr. 12, 2012

(51) Int. Cl.
| | | |
|---|---|---|
| C08G 18/00 | (2006.01) | |
| C08G 18/58 | (2006.01) | |
| C08G 59/18 | (2006.01) | |
| C08G 59/30 | (2006.01) | |
| C09D 163/00 | (2006.01) | |
| C09D 175/04 | (2006.01) | |
| C08G 59/06 | (2006.01) | |
| C08G 59/40 | (2006.01) | |

(52) U.S. Cl.
CPC .......... *C08G 18/585* (2013.01); *C08G 18/581* (2013.01); *C08G 59/066* (2013.01); *C08G 59/182* (2013.01); *C08G 59/302* (2013.01); *C08G 59/4028* (2013.01); *C09D 163/00* (2013.01); *C09D 175/04* (2013.01)

(58) Field of Classification Search
CPC .................................................. C08G 18/585
USPC ............ 528/65, 73, 76, 85; 428/423.1, 425.9; 524/589, 590, 839, 840
See application file for complete search history.

(56) References Cited

U.S. PATENT DOCUMENTS

| | | | |
|---|---|---|---|
| 2,594,979 A | 4/1952 | Nelson | |
| 3,539,474 A | 11/1970 | Sommer, Jr. | |
| 3,663,464 A | 5/1972 | Sawko | |
| 3,923,754 A | 12/1975 | Pellico | |
| 4,001,156 A | 1/1977 | Bosso et al. | |
| 4,314,920 A | 2/1982 | Millen | |
| 4,366,307 A * | 12/1982 | Singh et al. ............. | 528/373 |
| 4,609,762 A | 9/1986 | Morris et al. | |
| 4,689,389 A | 8/1987 | Lee et al. | |
| 5,369,152 A * | 11/1994 | Naderhoff et al. ........ | 523/415 |
| 5,434,225 A | 7/1995 | Mathes et al. | |
| 5,434,255 A | 7/1995 | Katayama et al. | |
| 5,466,860 A | 11/1995 | Flosbach et al. | |
| 5,610,243 A | 3/1997 | Vietti et al. | |
| 5,849,835 A | 12/1998 | Das et al. | |
| 5,912,319 A | 6/1999 | Zook et al. | |
| 6,172,179 B1 | 1/2001 | Zook et al. | |
| 7,345,101 B2 | 3/2008 | Pawlik et al. | |
| 7,524,564 B2 | 4/2009 | Cosman | |
| 7,569,163 B2 | 8/2009 | Tang et al. | |
| 2003/0008977 A1 | 1/2003 | Zook et al. | |
| 2004/0157002 A1 | 8/2004 | Bons et al. | |
| 2005/0010003 A1 * | 1/2005 | Sawant et al. ............. | 525/523 |
| 2005/0119449 A1 | 6/2005 | Zeitler et al. | |
| 2008/0139775 A1 * | 6/2008 | Wu et al. ................. | 528/44 |
| 2008/0224098 A1 * | 9/2008 | Tang et al. ............... | 252/500 |
| 2008/0281034 A1 * | 11/2008 | Ganguli et al. ........... | 524/539 |
| 2009/0012244 A1 | 1/2009 | Rao et al. | |
| 2010/0041839 A1 | 2/2010 | Anderson et al. | |
| 2010/0184899 A1 | 7/2010 | Rao et al. | |

FOREIGN PATENT DOCUMENTS

| | | |
|---|---|---|
| DE | 41 41 858 A1 | 6/1992 |
| EP | 0054379 | 6/1982 |
| EP | 1837354 | 9/2007 |
| EP | 1837354 A1 * | 9/2007 |
| JP | 59-129221 | 7/1984 |
| JP | 62-158714 | 7/1987 |
| JP | 02-036220 | 2/1990 |
| JP | 03-273021 | 12/1991 |
| JP | 04-363315 | 12/1992 |
| JP | 05-105861 | 4/1993 |
| JP | 06-116387 | 4/1994 |
| JP | 06-128353 | 5/1994 |
| JP | 06-172492 | 6/1994 |
| JP | 7224247 | 8/1995 |
| JP | 08-269203 | 10/1996 |
| JP | 9012972 | 1/1997 |
| JP | 09-059382 | 3/1997 |
| JP | 2000-344853 | 12/2000 |
| JP | 2006-089658 | 4/2006 |
| WO | WO 2006/037442 A1 | 4/2006 |
| WO | 2008137198 | 11/2008 |
| WO | WO 2009/095739 A1 | 8/2009 |
| WO | 2009131796 | 10/2009 |
| WO | WO 2009/124709 A1 | 10/2009 |

OTHER PUBLICATIONS

Machine translation of DE 41 41 858, 3 pgs.
Machine translation of JP 06-116387, 21 pgs.
Machine translation of JP 06-128353, 19 pgs.
Machine translation of JP 06-172492, 23 pgs.
Hexion Specialty Chemicals, Technical Data Sheet Re-issued Sep. 2007, "EPON™ Resin 1001F," printout from Hexion.com website, printed on Jun. 29, 2010, http://www.hexion.com/Products/TechnicalDataSheet.aspx?id=4017.
AkzoNobel, "Thioplast G—Polysulfide," printout from AkzoNobel website on Jun. 29, 2010, http://www.akzonobel.com/sulfurderivatives/products/thioplast_g/.

(Continued)

Primary Examiner — Michael L Leonard
(74) Attorney, Agent, or Firm — William R. Lambert

(57) ABSTRACT

Diethylene glycol monomethyl ether resistant coatings include a base component including a sulfur-containing, epoxy functional polyol, and an activator component including an isocyanate curing agent.

27 Claims, No Drawings

(56) References Cited

OTHER PUBLICATIONS

Aliband et al., "Epoxy paint failure in B-52 fuel tanks Part I—Preliminary development of a model for the process," *Progress in Organic Coatings*, vol. 56 (2006) pp. 285-296.

Alliband et al., "Epoxy paint failure in B-52 fuel tanks Part II. Influence of DIEGME concentration in the fuel on the failure process," *Progress in Organic Coatings*, vol. 63 (2008) pp. 139-147.

Cranker et al., "Epoxy Casting Resins Modified with Polysulfide Liquid Polymer," *Industrial and Engineering Chemistry*, vol. 48, No. 1, pp. 98-103.

Wilford, "Odour-free polysulphides for epoxy modification," *Pigment and Resin Technology*, Mar. 1989, pp. 12-14.

Hutt et al., "New High Temperature and Fuel Resistant Sealants Based on Permapol® P-3, Polythioether Polymers," *29th National SAMPE Symposium*, Apr. 3-5, 1984, pp. 1204-1212.

Marlowe et al., "Investigation into the Cause and Effects of Widespread Coating Failures and Corrosion on the Internal Surfaces of P-3 Orion Wing Integral Fuel Tanks," *Corrosion Reviews*, vol. 25, Nos. 5-6, 2007, pp. 533-544.

"Epoxy Resins," *Kirk-Othmer Encyclopedia of Chemical Technology*, vol. 10, Copyright John Wiley & Sons, Inc., pp. 347-471.

Lee, H. et al., "Handbook of Epoxy Resin", McGraw-Hill Book Company, 1982 Reissue, selected pages consisting of 13 sheets.

\* cited by examiner

DIETHYLENE GLYCOL MONOMETHYL ETHER RESISTANT COATING

STATEMENT REGARDING FEDERALLY SPONSORED RESEARCH OR DEVELOPMENT

This invention was made with Government support under Contract No. FA8650-05-C-5010, awarded by the Air Force Research Laboratory (AFRL). The United States Government may have certain rights in this invention.

FIELD OF THE INVENTION

The present invention is directed to diethylene glycol monomethyl ether (DIEGME) resistant coating compositions. More particularly, the present invention is directed to coating compositions that include a sulfur-containing, epoxy functional polyol and an isocyanate curing agent.

BACKGROUND OF THE INVENTION

Conventional aviation and aerospace fuel tank coatings, such as BMS10-39, may be degraded by certain fuel additives such as DIEGME. At elevated concentrations, DIEGME may chemically degrade conventional epoxy-based fuel tank paints or coatings, resulting in peeling of the topcoat. Such chemical degradation of conventional epoxy-based paints or coatings poses particular problems in aerospace or aviation applications, such as military aircraft, where DIEGME may be present in jet fuel or jet propellant (JP). DIEGME may be added to jet fuel or JP as a fuel system icing inhibitor (FSII), which prevents or reduces the buildup of ice inside of the fuel tank that may otherwise result from the low temperatures experienced due to aircraft operation in cold weather or at high altitude. For example, JP-5 and JP-8 are military jet fuels that typically include DIEGME as a FSII. Similarly, DIEGME may also be added to Jet A or Jet A-1 fuels as a FSII.

During normal aircraft operation, the DIEGME present in jet fuel may condense on the head space of the fuel tank in elevated concentrations, and/or it may become enriched in the residual water that may reside on the bottom of the fuel tank. At these elevated concentrations, DIEGME may act as a solvent for conventional epoxy-based fuel tank paints or coatings, which may result in topcoat swelling and/or peeling. Peeled fuel tank topcoat creates a dangerous operating condition for the aircraft as the peeled topcoat may enter and clog the fuel filter, thereby disrupting operation of the fuel system.

Fuel tank topcoat peeling problems resulting from the presence of DIEGME in jet fuel have been reported in United States Air Force (USAF) aircraft such as the B-52, KC-135, and C-17. Similar problems have been reported in United States Navy aircraft such as the P-3. Accordingly, there is a need for DIEGME resistant fuel tank coatings.

Additionally, Jet fuel contains microorganisms that consume plastic and rubber components of the aircraft fuel system, and produce acidic metabolic byproducts. Conventional epoxy-based coating compositions that include an amine-based curing system exhibit acceptable adhesion, but do not provide sufficient acid resistance and/or microbial byproducts resistance. Conversely, conventional coating compositions that include a polyurethane-based curing system exhibit acceptable acid and microbial byproducts resistance, but do not provide sufficient adhesion to a substrate, especially direct adhesion to a metal substrate. Accordingly, there is a need for coating compositions that have low temperature flexibility and good adhesion to a substrate, as well as resistance to DIEGME, fuel, methyl ethyl ketone, and microbial byproducts.

SUMMARY

Embodiments of the present invention include DIEGME resistant coatings including a sulfur-containing, epoxy functional polyol and an isocyanate curing agent. According to embodiments of the present invention the sulfur-containing, epoxy functional polyol includes a reaction product of reactants including a mercaptan terminated polymer and an epoxy resin.

In certain embodiments, the mercaptan terminated polymer includes a mercaptan terminated polysulfide or a mercaptan terminated polythioether.

In one embodiment, the mercaptan terminated polythioether includes a compound represented by Formula 1:

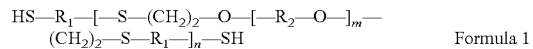

Formula 1 wherein $R_1$ denotes a $C_{2-6}$ n-alkylene, $C_{3-6}$ branched alkylene, $C_{6-8}$ cycloalkylene or $C_{6-10}$ alkylcycloalkylene group, or —[(—$CH_2$—)$_p$—X—]—(—$CH_2$—)$_r$— in which at least one —$CH_2$— unit is substituted with a methyl group, $R_2$ denotes a methylene, $C_{2-6}$ n-alkylene, $C_{2-6}$ branched alkylene, $C_{6-8}$ cycloalkylene or $C_{6-10}$ alkylcycloalkylene group, or —[(—$CH_2$—)$_p$—X—]$_q$—(—$CH_2$—)$_r$— in which at least one —$CH_2$— is substituted with a methyl group, X is one selected from the group consisting of O, S and —$NR_6$—, $R_6$ denotes H or methyl, m is a rational number from 0 to 10, n is an integer from 1 to 60, p is an integer from 2 to 6, q is an integer from 1 to 5, and r is an integer from 2 to 10.

In one embodiment, the mercaptan terminated polysulfide includes a compound represented by Formula 4:

Formula 4 wherein R is a linear or branched hydrocarbon, oxahydrocarbon, or thiahydrocarbon, and n is an integer from 1 to 38, for example from 7 to 38.

In one embodiment, the epoxy resin includes a compound represented by Formula 5:

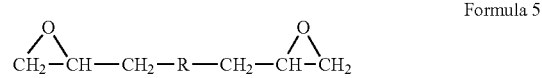

Formula 5 wherein R is an aliphatic group, a cylcloaliphatic group, an aromatic group, or a combination thereof.

In one embodiment the R group in the epoxy resin is represented by Formula 6:

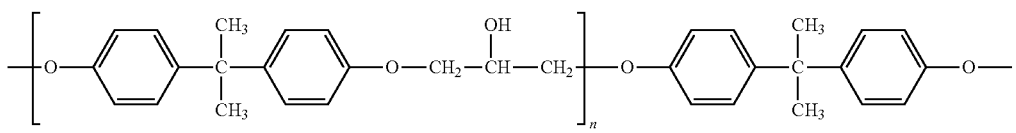

Formula 6 wherein n is an integer ranging from 1 to 10.

In another embodiment, the epoxy resin includes a polyglycidyl ether of a polyhydric phenol.

In one embodiment, the sulfur-containing, epoxy functional polyol includes a compound represented by Formula 7:

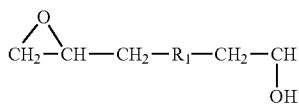 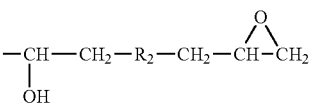

Formula 7 wherein Z includes a polythioether or polysulfide linkage;

$R_3$ includes an alkyl group or an aromatic group or a combination thereof, and includes at least two hydroxyl functional groups;

m is an integer ranging from 0 to 4; and each of $R_1$ and $R_2$ is independently an alkyl group or an aromatic group or a combination thereof.

In one embodiment, the sulfur-containing, epoxy functional polyol includes at least one terminal epoxy functional group and at least one pendant hydroxyl functional group.

The sulfur-containing, epoxy functional polyol may have a weight average molecular weight of about 10,000 or less.

The coating composition may have an isocyanate to hydroxyl ratio ranging from about 1:1 to about 20:1.

The isocyanate curing agent may include an isocyanate represented by NCO—R' or an isocyanate represented by NCO—R"—NCO or a combination thereof, wherein each of R' and R" independently includes an alkyl group or an aromatic group or a combination thereof.

The isocyanate curing agent may include an isocyanate functional group, and upon curing the coating composition at least one isocyanate functional group may react with moisture to form at least one urea functional group.

Upon cure, the isocyanate curing agent may cross-link the sulfur-containing, epoxy functional polyol to form an epoxy functional polyurethane compound.

In one embodiment, the coating composition includes:
a) a compound represented by Formula 7:

Z includes a polythioether or polysulfide linkage; and
b) an isocyanate curing agent.

In the coating composition according to certain embodiments, Z may include a polythioether linkage represented by Formula 8:

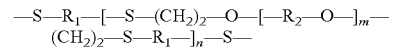

Formula 8 wherein $R_1$ denotes a $C_{2-6}$ n-alkylene, $C_{3-6}$ branched alkylene, $C_{6-8}$ cycloalkylene or $C_{6-10}$ alkylcycloalkylene group, or —[(—$CH_2$—)$_p$—X—]$_q$—(—$CH_2$—)$_r$— in which at least one —$CH_2$— unit is substituted with a methyl group, $R_2$ denotes a methylene, $C_{2-6}$ n-alkylene, $C_{2-6}$ branched alkylene, $C_{6-8}$ cycloalkylene or $C_{6-10}$ alkylcycloalkylene group, or —[(—$CH_2$—)$_p$—X—]$_q$—(—$CH_2$—)$_r$— in which at least one —$CH_2$— is substituted with a methyl group, X is one selected from the group consisting of O, S and —$NR_6$—, $R_6$ denotes H or methyl, m is a rational number from 0 to 10, n is an integer from 1 to 60, p is an integer from 2 to 6, q is an integer from 1 to 5, and r is an integer from 2 to 10.

The coating composition may have an isocyanate to hydroxyl ratio ranging from about 1:1 to about 20:1.

The isocyanate curing agent may include an isocyanate represented by NCO—R' or an isocyanate represented by NCO—R"—NCO or a combination thereof, wherein each of R' and R" is independently an alkyl group or an aromatic group or a combination thereof.

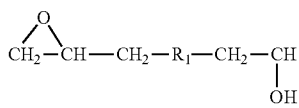 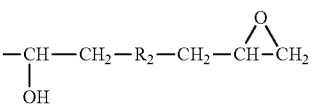

Formula 7 wherein:

each of $R_1$ and $R_2$ independently includes an alkyl group or an aromatic group or a combination thereof, $R_3$ includes an alkyl group or an aromatic group or a combination thereof, and includes at least two hydroxyl functional groups, m is an integer ranging from 0 to 4, and The isocyanate curing agent may include an isocyanate functional group, and upon curing the coating composition, at least one isocyanate functional group may react with moisture to form at least one urea linkage.

Upon cure, the isocyanate curing agent may cross-link the sulfur-containing, epoxy functional polyol to form an epoxy functional polyurethane compound.

DETAILED DESCRIPTION

Embodiments of the present invention provide DIEGME resistant coating compositions. According to embodiments of the present invention, the DIEGME resistant coating compositions are suitable for aerospace or aviation fuel tank applications. Fuel tanks that include a DIEGME resistant coating will require less frequent fuel tank topcoat replacement, thereby dramatically reducing the maintenance costs of the aircraft. For example, USAF B-52 aircraft currently require fuel tank refurbishment every four years, at a cost of $120,000 per aircraft. At current B-52 fleet levels, the current fuel tank refurbishment rate of every four years, and a projected aircraft service life to the year 2040, the reduced maintenance costs resulting from a DIEGME resistant fuel tank coating composition would produce a cost saving of almost $90 million for the B-52 fleet alone. In addition to the need for DIEGME resistance, to tolerate high altitude and/or cold weather aircraft operating conditions, fuel tank coating compositions should exhibit low temperature flexibility. Furthermore, fuel tank coating compositions should exhibit acid and microbial byproducts resistance.

The coating compositions according to embodiments of the present invention have cross-linking sites, low temperature flexibility, good adhesion to a substrate, and are resistant to DIEGME, fuel, methyl ethyl ketone (MEK), and microbial byproducts. Accordingly, coating compositions according to embodiments of the present invention are suitable for aerospace or aviation fuel tank applications and coating applications where fuel resistance, adhesion to a substrate, solvent resistance, water resistance, chemical resistance, and low temperature flexibility are desired.

In one embodiment, a DIEGME resistant coating composition includes a sulfur-containing, epoxy functional polyol and an isocyanate curing agent. According to embodiments of the present invention, the sulfur-containing, epoxy functional polyol may be prepared from the reaction of at least one mercaptan terminated polythioether or polysulfide with an epoxy resin. This sulfur-containing, epoxy functional polyol imparts DIEGME resistance, fuel resistance, low temperature flexibility, hydroxyl group cross-linking sites, and good adhesion to a substrate. The polyisocyanate curing agent cross-links the sulfur-containing, epoxy functional polyol to form an epoxy functional polyurethane linkage. Additionally, excess polyisocyanate cures with moisture to form urea, which provides solvent resistance (e.g., MEK and DIEGME resistance) and microbial byproducts resistance. According to embodiments of the present invention, the coating composition may further include any suitable additive, including, but not limited to a pigment or a mixture of pigments.

As indicated, certain embodiments of the present invention are directed to coating compositions. As used herein, the term "coating composition" refers to a composition that is capable of producing a film that has the ability to resist atmospheric conditions, such as moisture and temperature, and at least partially block the transmission of materials, such as water, fuel, and other liquids and gasses. In certain embodiments, the coating compositions of the present invention are useful as aerospace or aviation coating compositions for fuel tanks. Also, "coating composition" refers to a two-component system including a base component including, e.g., the sulfur-containing epoxy functional polyol, and an activator component including, e.g., the isocyanate curing agent. However, it is understood that either the base or activator components can include other components, such as pigments or other additives. In use, when ready to apply the coating composition to a substrate, the base component and activator component are mixed together, applied to the substrate and allowed to cure.

The term "DIEGME resistant coating composition" as used herein refers to a coating composition that resists or, in some cases, substantially prevents, the alteration or degradation of the coating due to chemical reaction with DIEGME. As used herein, the term "substantially" is used as a term of approximation, and is intended to account for the possible presence of negligible signs of alteration or degradation.

According to embodiments of the present invention, the sulfur-containing, epoxy functional polyol can be prepared from the reaction of a mercaptan terminated polymer and an epoxy resin. As used herein, the terms "mercaptan terminated", "thiol", "thiol group", "mercapto", and "mercapto group" refer to an —SH group that is capable of forming a thioether linkage. In certain embodiments, the sulfur-containing, epoxy functional polyol includes at least one terminal epoxy functional group and at least one pendant hydroxyl functional group. Scheme 1 illustrates an exemplary reaction of an epoxy resin and a mercaptan terminated polymer to form a sulfur-containing, epoxy functional polyol.

SCHEME 1

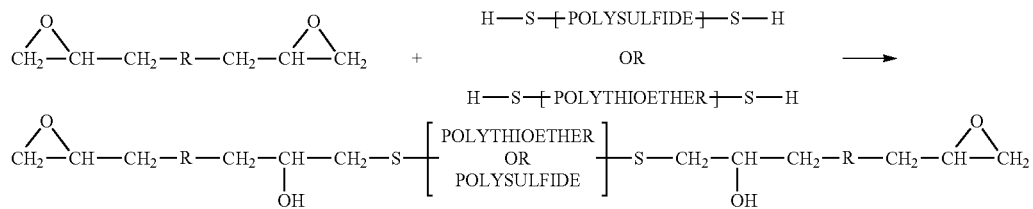

According to embodiments of the present invention, the sulfur-containing, epoxy functional polyol is cross-linked with an isocyanate curing agent to prepare an epoxy functional urethane polymer. Scheme 2, below, shows an exemplary reaction of the hydroxyl functional group with an isocyanate functional group to form a urethane functional group.

SCHEME 2

In certain embodiments, the isocyanate curing agent may be a diisocyanate or a polyisocyanate. Scheme 3 illustrates an exemplary reaction of a hydroxyl group of a sulfur-containing, epoxy functional polyol and the isocyanate functional group of a polyisocyanate curing agent to form an isocyanate functional urethane compound.

SCHEME 3

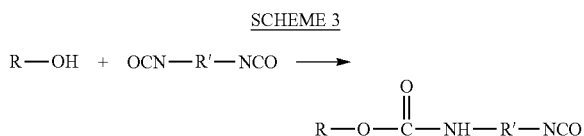

As discussed above, excess isocyanate reacts with moisture to form urea. Scheme 4 illustrates this general reaction.

SCHEME 4

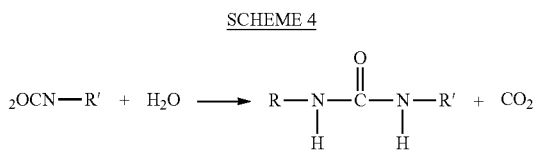

While the urea (or polyurea in some embodiments) may remain as a byproduct, in some embodiments, the urea (or polyurea) may react with the isocyanate functional urethane compound to form an isocyanate and urea functional polymer. Scheme 5 illustrates an exemplary reaction of the ure-

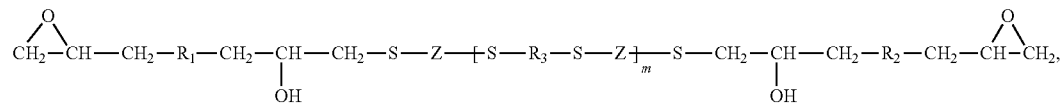

thane, excess isocyanate curing agent, and water from moisture to form a urethane and urea functional polymer.

SCHEME 5

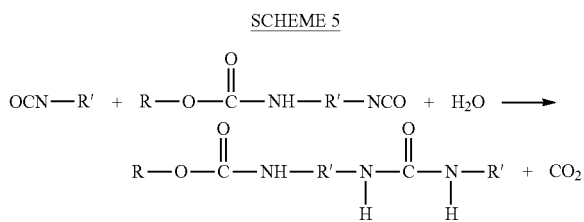

As noted above, the isocyanate curing agent may be a diisocyanate or polyisocyanate. Scheme 6 illustrates the reaction of an isocyanate functional urethane compound, excess diisocyanate curing agent, and water from moisture to form an isocyanate functional urethane/urea compound.

SCHEME 6

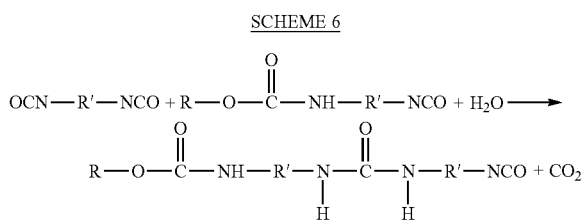

To make the coating composition, the base component, e.g., the sulfur-containing epoxy functional polyol, is mixed with the activator component, e.g, the isocyanate curing agent. The composition is then applied to a substrate and allowed to cure. As noted above, the coating composition may further include any number of suitable additives in either the base component or activator component.

Each of the components of the coating composition will now be described. In particular, the sulfur-containing epoxy functional polyol included in the base component, as well as the isocyanate curing agent included in the activator component, and the additional additives which may be included in either the base or activator component will be described.

Base Component: Sulfur-Containing Epoxy Functional Polymer

As discussed above, the base component includes a sulfur-containing epoxy functional polymer. In some embodiments, the sulfur-containing epoxy functional polyol is prepared by reacting a sulfur containing polymer with an epoxy resin.

I. Sulfur-Containing Polymer

As discussed above, the sulfur-containing, epoxy functional polyol may be prepared by reacting an epoxy resin with a polymer having sulfur in the backbone. Non-limiting examples of polymers having sulfur in the backbone include polythioethers and polysulfides.

According to embodiments of the present invention, the sulfur-containing, epoxy functional polyol is a compound represented by Formula 7:

where Z is a polythioether or polysulfide linkage, $R_3$ is an alkyl group or an aromatic group or a combination thereof and includes at least two hydroxyl functional groups, m is an integer from 0 to 4, and each of $R_1$ and $R_2$ is independently an alkyl group or an aromatic group or a combination thereof. In certain embodiments, Z may include a polythioether linkage represented by Formula 8: $-S-R_1-[-S-(CH_2)_2-O-[-R_2-O-]_m-(CH_2)_2-S-R_1-]_n-S-$, where $R_1$ denotes a $C_{2-6}$ n-alkylene, $C_{3-6}$ branched alkylene, $C_{6-8}$ cycloalkylene or $C_{6-10}$ alkylcycloalkylene group, or $-[(-CH_2-)_p-X-]_q-(-CH_2-)_r-$ in which at least one $-CH_2-$ unit is substituted with a methyl group. $R_2$ denotes a methylene, $C_{2-6}$ n-alkylene, $C_{2-6}$ branched alkylene, $C_{6-8}$ cycloalkylene or $C_{6-10}$ alkylcycloalkylene group, or $-[(-CH_2-)_p-X-]_q-(-CH_2-)_r-$ in which at least one $-CH_2-$ is substituted with a methyl group. X is selected from O, S and $-NR_6-$, where $R_6$ denotes H or methyl, m is a rational number from 0 to 10, n is an integer from 1 to 60, p is an integer from 2 to 6, q is an integer from 1 to 5, and r is an integer from 2 to 10. According to an embodiment of the present invention, the coating composition may include a compound represented by Formula 7 and an isocyanate curing agent.

In certain embodiments of the present invention, the sulfur-containing, epoxy functional polyol has a weight average molecular weight of about 10,000 or less. Such a sulfur-containing, epoxy functional polyol may have a weight average molecular weight in a range of about 4,000 to about 8,000. In other embodiments, the sulfur-containing, epoxy functional polyol may have a weight average molecular weight in a range of about 2,000 to about 5,000. In certain embodiments the sulfur-containing, epoxy functional polyol may have a weight average molecular weight of about 5,000. In other embodiments the sulfur-containing, epoxy functional polyol may have a weight average molecular weight of about 3,000.

A. Polythioethers

According to embodiments of the present invention, a sulfur-containing, epoxy functional polyol can be prepared from the reaction of an epoxy resin and a mercaptan terminated polythioether. Polythioethers useful in embodiments of the present invention can be difunctional, that is, linear polymers having two end groups, or polyfunctional, that is, branched polymers having three or more end groups. As used herein, the term "polythioether" refers to a polymer containing at least one thioether linkage; that is —[—R—S—R—]—, where R is a linear, branched, cyclic, or aromatic hydrocarbon, oxahydrocarbon, or thiahydrocarbon.

Polythioethers suitable for use in the present invention include those described in U.S. Pat. No. 6,172,179, the entire contents of which are incorporated herein by reference. Suitable polythioethers typically have a number average molecular weight of 1,000 to 10,000, such as 2,000 to 5,000 or 3,000 to 4,000. The mercaptan terminated polythioethers suitable for use in embodiments of the present invention contain reactive, terminal mercaptan groups, having an average mercaptan functionality typically ranging from 2.05 to 3.0, such as from 2.1 to 2.6. A specific average functionality can be achieved by suitable selection of reactive ingredients. Examples of suitable polythioethers are available from PRC-Desoto International, Inc., under the trademark PERMAPOL®, such as PERMAPOL P-3.1E or PERMAPOL P-3. Suitable mercaptan terminated polythioethers include combinations of polythioethers.

In certain embodiments, the polythioether includes a compound that contains at least two reactive thiol groups, such as, for example, those represented by Formula 1: HS—$R_1$—[—S—$(CH_2)_2$—O—[—$R_2$—O—$]_m$—$(CH_2)_2$—S—$R_1$—$]_n$—SH, where $R_1$ denotes a $C_{2-6}$ n-alkylene, $C_{3-6}$ branched alkylene, $C_{6-8}$ cycloalkylene or $C_{6-10}$ alkylcycloalkylene group, or —[(—$CH_2$—$)_p$—X—$]_q$—(—$CH_2$—$)_r$— in which at least one —$CH_2$— unit is substituted with a methyl group. $R_2$ denotes a $C_{2-6}$ n-alkylene, $C_{2-6}$ branched alkylene, $C_{6-8}$ cycloalkylene or $C_{6-10}$ alkylcycloalkylene group, or —[(—$CH_2$—$)_p$—X—$]_q$—(—$CH_2$—$)_r$—. X is selected from O, S and —$NR_6$—, where $R_6$ denotes H or methyl. In these formulae, m is a rational number from 0 to 10, n is an integer from 1 to 60, p is an integer from 2 to 6, q is an integer from 1 to 5, and r is an integer from 2 to 10.

Such mercaptan-terminated polythioethers suitable for use in embodiments of the present invention can be prepared by a number of methods. For example, polythioethers can be prepared by reacting a divinyl ether or mixture thereof with an excess of a dithiol or mixture thereof. In certain embodiments, (n+1) moles of a compound represented by formula 2: HS—$R_1$—SH, or a mixture of at least two different compounds having the formula 2, are reacted with n moles of a compound represented by formula 3: $CH_2$=CH—O—[—$R_2$—O—$]_m$—CH=$CH_2$, or a mixture of at least two different compounds having the formula 3, in the presence of a catalyst. In formulae 2 and 3 above, $R_1$, $R_2$ and all indices are defined as in formula 1. This method affords a mercaptan-terminated difunctional polythioether. The compounds of formula 2 are dithiol compounds, including compounds in which $R_1$ is a $C_{2-6}$ n-alkylene group, e.g., 1,2-ethanedithiol, 1,3-propanedithiol, 1,4-butanedithiol, 1,5-pentanedithiol or 1,6-hexanedithiol.

Additional suitable dithiols include those compounds in which $R_1$ is a $C_{3-6}$ branched alkylene group, having one or more pendant groups which can be, for example, methyl or ethyl groups. Compounds having branched alkylene $R_1$ include 1,2-propanedithiol, 1,3-butanedithiol, 2,3-butanedithiol, 1,3-pentanedithiol and 1,3-dithio-3-methylbutane. Other useful dithiols include those in which $R_1$ is a $C_{6-8}$ cycloalkylene or $C_{6-10}$ alkylcycloalkylene group, for example, dipentenedimercaptan and ethylcyclohexyldithiol (ECHDT).

Further suitable dithiols include one or more heteroatom substituents in the carbon backbone, that is, dithiols in which X is a heteroatom such as O, S or another bivalent heteroatom radical; a secondary or tertiary amine group, i.e., —$NR_6$—, where $R_6$ is hydrogen or methyl; or another substituted trivalent heteroatom. In certain embodiments, X is O or S, and thus $R_1$ is —[(—$CH_2$—$)_p$—O—$]_q$—(—$CH_2$—$)_r$— or —[(—$CH_2$—$)_p$—S—$]_q$—(—$CH_2$—$)_r$—. The indices p and r may be equal, and may both have the value of 2. Exemplary dithiols of this type include dimercaptodiethylsulfide (DMDS) (p=2, r=2, q=1, X=S); dimercaptodioxaoctane (DMDO) (p=2, q, r=2, X=O); and 1,5-dithia-3-oxapentane (p=2, r=2, q=1, X=O). It is also possible to employ dithiols that include both heteroatom substituents in the carbon backbone and pendant alkyl, such as methyl groups. Such compounds include methyl-substituted DMDS, such as HS—$CH_2$CH($CH_3$)—S—$CH_2CH_2$—SH, HS—CH($CH_3$)$CH_2$—S—$CH_2CH_2$—SH and dimethyl substituted DMDS such as HS—$CH_2$CH($CH_3$)—S—CH($CH_3$)$CH_2$—SH and HS—CH($CH_3$)$CH_2$—S—$CH_2$CH($CH_3$)—SH. Two or more different dithiols of formula 2 can also be employed if desired in preparing polythioethers suitable for use in the present invention.

The compounds of formula 3 are divinyl ethers. Divinyl ether itself (m=0) can be used. Other suitable divinyl ethers include those compounds having at least one oxyalkylene group, such as from 1 to 4 oxyalkylene groups (i.e., those compounds in which m is an integer from 1 to 4). In certain embodiments, m is an integer from 2 to 4. It is also possible to employ commercially available divinyl ether mixtures in producing suitable polythioethers. Such mixtures are characterized by a non-integral average value for the number of alkoxy units per molecule. Thus, m in formula 3 can also take on non-integral, rational values between 0 and 10, such as between 1 and 10, or, in some cases, between 1 and 4, such as between 2 and 4.

Exemplary divinyl ethers include those compounds in which $R_2$ is a $C_{2-6}$ n-alkylene or $C_{2-6}$ branched alkylene, such as ethylene glycol divinyl ether (EG-DVE) ($R_2$=ethylene, m=1); butanediol divinyl ether (BD-DVE) ($R_2$=butylene, m=1); hexanediol divinyl ether (HD-DVE) ($R_2$=hexylene, m=1); diethylene glycol divinyl ether (DEG-DVE) ($R_2$=ethylene, m=2); triethylene glycol divinyl ether ($R_2$=ethylene, m=3); tetraethylene glycol divinyl ether ($R_2$=ethylene, m=4); and polytetrahydrofuryl divinyl ether. In certain embodiments, the polyvinyl ether monomer can further include one or more pendant groups selected from alkylene groups, hydroxyl groups, alkeneoxy groups, and amine groups. Useful divinyl ether blends include "PLURIOL®" type blends such as PLURIOL® E-200 divinyl ether (commercially available from BASF), for which $R_2$=ethyl and m=3.8, as well as "DPE" polymeric blends such as DPE-2 and DPE-3 (commercially available from International Specialty Products, Wayne, N.J.), Useful divinyl ethers in which $R_2$ is $C_{2-6}$ branched alkylene can be prepared by reacting a polyhydroxy compound with acetylene. Exemplary compounds of this type include compounds in which $R_2$ is an alkyl-substituted methylene group such as —CH($CH_3$)— or an alkyl-substituted ethylene such as —$CH_2$CH($CH_3$)—.

Other useful divinyl ethers include compounds in which $R_2$ is polytetrahydrofuryl (poly-THF) or polyoxyalkylene, preferably having an average of about 3 monomer units.

Two or more compounds of the formula 3 can be used in the foregoing method. Thus in preferred embodiments of the invention, two compounds of formula 2 and one compound of formula 3, one compound of formula 2 and two compounds of formula 3, two compounds of formula 2 and of formula 3, and more than two compounds of one or both formulae, can be used to produce a variety of polythioethers according to the invention, and all such combinations of compounds are contemplated as being within the scope of the invention.

Although, as indicated above, compounds of the formulae 2 and 3 which have pendant alkyl groups, for example pendant methyl groups, are useful in embodiments of the invention, compounds of formulae 2 and 3, which are free of pendant methyl or other alkyl groups, also afford polythioethers that are suitable for use in embodiments of the present invention.

The reaction between the compounds of formulae 2 and 3 is sometimes catalyzed by a free radical catalyst. Suitable free radical catalysts include azo compounds, for example azobisnitrile compounds such as azo(bis)isobutyronitrile (AIBN); organic peroxides such as benzoyl peroxide and t-butyl peroxide; and similar free-radical generators. The reaction can also be effected by irradiation with ultraviolet light either with or without the use of a photosensitizer, such as benzophenone. Ionic catalysis methods, using either inorganic or organic bases, e.g., triethylamine, also yield materials useful in the context of embodiments of the present invention.

The polythioethers useful in the present invention can be prepared by combining at least one compound of formula 2 and at least one compound of formula 3, followed by addition of an appropriate catalyst, and carrying out the reaction at a temperature from about 30 to about 120° C. for a time from about 2 to about 24 hours. In certain embodiments, the reaction is carried out at a temperature from about 70 to about 90° C. for a time from about 2 to about 6 hours.

B. Polysulfides

According to embodiments of the present invention, a sulfur-containing, epoxy functional polyol can be prepared from the reaction of an epoxy resin and a mercaptan terminated polysulfide. Polysulfides useful in embodiments of the present invention can be difunctional, that is, linear polymers having two end groups, or polyfunctional, that is, branched polymers having three or more end groups. As used herein, the term "polysulfide" refers to a polymer containing at least one sulfide linkage (i.e. a sulfur linkage —[—S—S—]—) in the polymer backbone and/or in the terminal or pendant positions of the polymer chain. For example, mercaptan terminated polysulfides suitable for use in embodiments of the present invention include compounds represented by Formula 4: HS—(R—SS)$_n$—R—SH, where R is a linear, branched, cyclic, or aromatic hydrocarbon, oxahydrocarbon, or thiahydracarbon Typically, polysulfides useful in embodiments of the present invention will have two or more sulfur-sulfur linkages. Suitable polysulfides are commercially available from Akzo Nobel under the name THIOPLAST (e.g. Thioplast G-1). THIOPLAST products are available in a wide range of molecular weights ranging, for example, from less than 1,100 to over 8,000, with molecular weight being the average molecular weight in grams per mole. Particularly suitable is a number average molecular weight of 1,000 to 4,000. The crosslink density of these products also varies, depending on the amount of crosslinking agent used. The "—SH" content, i.e. the mercaptan content, of these products may also vary. The mercaptan content and molecular weight of the polysulfide can affect the cure speed of the blend, with cure speed increasing with molecular weight.

In some embodiments, it is desirable to use a combination of polysulfides to achieve the desired molecular weight and/or crosslink density in the coating composition. Different molecular weights and/or crosslink densities can contribute different characteristics to the coating composition.

II. Epoxy Resin

According to embodiments of the present invention, a sulfur-containing, epoxy functional polyol can be prepared from the reaction of an epoxy resin and a mercaptan terminated polymer. Suitable epoxy resins for use in preparing the coating compositions of the present invention contain at least one epoxy group, such as monoglycidyl ethers of a monohydric phenol or alcohol or di- or polyglycidyl ethers of polyhydric alcohols. The epoxy resin can be a compound or a mixture of compounds having a 1,2-epoxy group. Particularly suitable epoxy resins have a 1,2-epoxy equivalency greater than 1.0, that is, in which the average number of 1,2-epoxy groups per molecule is greater than 1. The epoxy resin can be any of the well-known epoxides. Examples of these polyepoxides have, for example, been described in U.S. Pat. Nos. 2,467,171; 2,615,007; 2,716,123; 3,030,336; 3,053,855 and 3,075,999, the entire contents of which are incorporated herein by reference.

In one embodiment, the epoxy-functional material contains at least two epoxy groups per molecule and has aromatic or cycloaliphatic functionality to improve adhesion to a metal substrate. In some embodiments, the epoxy-functional materials may be relatively more hydrophobic than hydrophilic in nature. In one embodiment, the epoxy-containing material is a polymer having a number average molecular weight (Mn) of from about 220 to 25,000, such as 220 to 4500. The Mn can be determined, for example, by multiplying the epoxy equivalent weight (epoxy equivalent) by the epoxy functionality (number of epoxy groups).

Examples of suitable monoglycidyl ethers of a monohydric phenol or alcohol include phenyl glycidyl ether and butyl glycidyl ether. Suitable polyglycidyl ethers of polyhydric alcohols can be formed by reacting epihalohydrins with polyhydric alcohols, such as dihydric alcohols, in the presence of an alkali condensation and dehydrohalogenation catalyst such as sodium hydroxide or potassium hydroxide. Useful epihalohydrins include epibromohydrin, dichlorohydrin and especially epichlorohydrin.

Suitable polyhydric alcohols can be aromatic, aliphatic or cycloaliphatic and include but are not limited to phenols that are at least dihydric phenols, such as dihydroxybenzenes, for example resorcinol, pyrocatechol and hydroquinone; bis(4-hydroxyphenyl)-1,1-isobutane; 4,4-dihydroxybenzophenone; bis(4-hydroxyphenyl)-1,1-ethane; bis(2-hydroxyphenyl)methane; 1,5-hydroxynaphthalene; 4-isopropylidene bis (2,6-dibromophenol); 1,1,2,2-tetra(p-hydroxy phenyl)-ethane; 1,1,3-tris(p-hydroxy phenyl)-propane; novolac resins; bisphenol F; long-chain bisphenols; and 2,2-bis(4-hydroxyphenyl)propane (bisphenol A), which is especially suitable. Aliphatic polyhydric alcohols that can be used include but are not limited to glycols such as ethylene glycol, diethylene glycol, triethylene glycol, 1,2-propylene glycol, 1,4-butylene glycol, 2,3-butylene glycol, pentamethylene glycol, polyoxyalkylene glycol; polyols such as sorbitol, glycerol, 1,2,6-hexanetriol, erythritol and trimethylolpropane; and mixtures thereof. An example of a suitable cycloaliphatic alcohol is cyclohexanedimethanol.

There can also be used polyglycidyl esters of polycarboxylic acid which are produced by the reaction of epichlorohydrin or a similar epoxy compound with an aliphatic or aromatic polycarboxylic acid, such as oxalic acid, succinic acid, glutaric acid, terephthalic acid, 2,6-naphthylene dicarboxylic acid, dimerized linolenic acid, and the like. Examples are diglycidyl adipate and diglycidyl phthalate.

Epoxy-containing polymers useful in the present invention are disclosed in U.S. Pat. Nos. 5,294,265; 5,306,526 and 5,653,823, the entire contents of which are hereby incorporated by reference. Other useful epoxy-containing materials include epoxy-functional acrylic polymers, glycidyl esters of carboxylic acids and mixtures thereof. Suitable commercially available epoxy-containing polymers are available from Shell Chemical Company under the names EPON 836, EPON 828, EPON 1002F and EPON 1004F. EPON 836 and EPON 828 are epoxy-functional polyglycidyl ethers of bisphenol A prepared from bisphenol A and epichlorohydrin. EPON 828 has an Mn of about 400 and an epoxy equivalent weight of about 185 to 192. EPON 836 has an Mn of about 625 and an epoxy equivalent weight of about 310 to 315. EPON 1002F has an Mn of about 1300 and an epoxy equivalent weight of about 650, while EPON 1004F has an Mn of about 1840 and an epoxy equivalent weight of about 920.

In some embodiments, the epoxy resin can include solid epoxy resins with an epoxide equivalent weight (EEW) of about 300 to 2000. Suitable products include, for example, EPON Resin 1001F, 1002F and 1004F and 1007F from Hexion Specialty Chemicals and DER661, 662E, 663U, and 664U from Dow Chemical Company. Examples of other epoxy resins suitable for use in the present invention include monoepoxies, diglycidyl ethers of dihydric compounds, epoxy novolacs and cycloaliphatic epoxies, and other modified epoxy resins. Suitable products include, for example, HELOXY modifier 8, 64, 67, 68, 84, 505, CADURA E-10p glycidyl ether, EPON resin SU-3, SU-8 from Hexion Specialty Chemicals, and DER 732, 736, DEN431, 438, 439 from Dow Chemical Company.

In certain embodiments of the present invention, the epoxy resin is a compound represented by Formula 5:

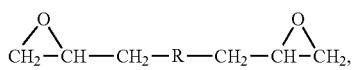

where R is an aliphatic group, a cycloaliphatic group, an aromatic group, or a combination thereof. In particular, in certain embodiments of the present invention, the epoxy resin includes a polyglycidyl ether of a polyhydric phenol. For example, in some embodiments, the R of Formula 5 may be a linkage represented by Formula 6:

Formula 6:

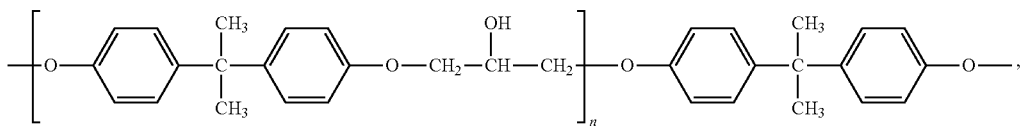

where n is an integer ranging from 1 to 10.

To make the sulfur-containing epoxy functional polyol that is included in the base component, the sulfur-containing polymer is reacted with the epoxy resin. In some embodiments, the sulfur-containing polymer and epoxy resin are used in amounts suitable to give an epoxy to mercaptan ratio of about 1:1 to about 4:1 by equivalent weight. In one embodiment, for example, the sulfur-containing polymer and epoxy resin are used in amounts suitable to give an epoxy to mercaptan ratio of about 3.5:1 by equivalent weight. In some embodiments, the sulfur-containing polymer and epoxy resin are used in amounts suitable to give an epoxy to mercaptan ratio of about 10:90 to about 90:10 by weight percentage. For example, in some embodiments, the sulfur-containing polymer and epoxy resin are used in amounts suitable to give an epoxy to mercaptan ratio of about 50:50 by weight percentage.

Activator Component: Isocyanate Curing Agent

As discussed above, the activator component includes an isocyanate curing agent. The activator component (and/or the base component) may also optionally including one or more additional additives.

I. Isocyanate Curing Agent

As noted above, in certain embodiments, isocyanate curing agents are used. Any isocyanates containing free isocyanate functions may be suitable for use in embodiments of the present invention. As used herein, the term "isocyanate" is intended to include blocked (or capped) polyisocyanates as well as unblocked polyisocyanates. If the isocyanate is blocked or capped, any suitable blocking or capping agent can be used, provided that the agent has a sufficiently low deblocking temperature. Examples of such suitable blocking or capping agents include: alcohols, lactams, oximes, malonic esters, alkyl acetoacetates, triazoles, phenols and amines. Of these, oximes (e.g., acetone oxime, methyl ethyl ketoxime, methyl amyl ketoxime, diisobutyl ketoxime, formaldehyde oxime) are particularly suitable. Other useful curing agents include blocked polyisocyanate compounds, such as the tricarbamoyl triazine compounds described in detail in U.S. Pat. No. 5,084,541, the entire contents of which is incorporated herein by reference.

In some embodiments, the isocyanate curing agent may include an isocyanate represented by NCO—R' or an isocyanate represented by NCO—R"—NCO or a combination thereof, wherein each of R' and R" independently includes an alkyl group or an aromatic group or a combination thereof. The isocyanate curing agent may include an isocyanate functional group, and upon curing the coating composition, at least one isocyanate functional group may react with moisture to form urea or polyurea. In addition, upon cure, the isocyanate curing agent may cross-link the sulfur-containing, epoxy functional polyol to form an epoxy functional polyurethane compound. Also, while the urea or polyurea may remain as a byproduct, the urea or polyurea may also react with the epoxy functional polyurethane compound to yield a polymer having urea and urethane linkages.

Nonlimiting examples of suitable polyisocyanates include aliphatic, cycloaliphatic or aromatic polyisocyanates such as, for example, diisocyanates, such as aliphatic, cycloaliphatic and aromatic diisocyanates customary in lacquers, e.g. toluene 2,4-diisocyanate, toluene 2,6-diisocyanate, diphenylmethane 2,4'- and/or 4,4'-diisocyanate, hexamethylene 1,6-diisocyanate, m-xylylene diisocyanate, p-xylylene diisocyanate, tetramethylene diisocyanate, 1-isocyanato-3,3,5-trimethyl-5-isocyanato-methylcyclohexane (isophorone diisocyanate=IPDI), or tetramethylxylylene diisocyanate, propylene 1,2-diisocyanate, 2,2,4-trimethylene diisocyanate, tetramethylene diisocyanate, butylene 2,3-diisocyanate, dodecane 1,12-diisocyanate, cyclohexane 1,3- and 1,3-diisocyanate, perhydro-2,4' and/or 4,4'-diphenylmethane diisocyanate, phenylene 1,3- and 1,4-diisocyanate, 3,2'- and/or 3,4'-diisocyanato-4-methyldiphenylmethane, naphthalene 1,5-diisocyanate, triphenylmethane 4,4'-triisocyanate or mixtures of said compounds. In addition, isocyanate prepolymers, for example reaction products of polyisocyanates with polyols, can also be used, as can mixtures of polyisocyanates.

The known polyisocyanates that are usually used in the preparation of lacquers are particularly suitable for the invention, e.g. modifying products of the above-mentioned simple polyisocyanates having biuret, isocyanurate or urethane groups, particularly polyisocyanates having tris-(6-isocyanatohexyl) biuret or low molecular weight urethane groups, of the kind that may be obtained by reaction of IPDI used in excess with simple polyhydric alcohols in the molecular weight range of 62 to 300, particularly with trimethylol propane. Of course, any mixtures of the polyisocyanates mentioned may also be used for the preparation of the products according to the invention.

Suitable polyisocyanates are, moreover, the known prepolymers having terminal isocyanate groups, of the kind that are accessible particularly by reaction of the above-mentioned simple polyisocyanates, mainly diisocyanates, with deficient quantities of organic compounds with at least two groups that are reactive towards isocyanate groups. Compounds with a number average molar mass of 300 to 10000, preferably 400 to 6000 having a total of at least two amino groups and/or hydroxyl groups are used in preference as such. The corresponding polyhydroxyl compounds, e.g. the hydroxyl polyesters, hydroxyl polyethers and/or hydroxyl group-containing acrylate resins known in polyurethane chemistry are used in preference.

The use of copolymers of the vinylically unsaturated monoisocyanate dimethyl-m-isopropenylbenzyl isocyanate, as described in DE-A 41 37 615 (the entire content of which is incorporated herein by reference), is also possible.

Typically, isocyanate curing agents are used in combination with hydroxyl containing compounds at low isocyanate to hydroxyl ratios. Often, isocyanate curing agents are used in combination with hydroxyl containing compounds at isocyanate to hydroxyl ratios in a range of about 1:1 to 1.5:1 by equivalent weight. The inventors of the present invention have discovered, however, that high isocyanate to hyrdoxyl ratios provide unexpected and beneficial results. In certain embodiments of the present invention, the coating composition has an isocyanate to hydroxyl ratio in a range of about 1:1 to about 20:1 by equivalent weight. In some embodiments, the isocyante curing agent and the sulfur-containing epoxy functional polyol are used in amounts suitable to provide an isocyanate to hydroxyl ratio of about 3 to 1 or greater by equivalent weight. For example, in some embodiments, the isocyante curing agent and the sulfur-containing epoxy functional polyol are used in amounts suitable to provide an isocyanate to hydroxyl ratio of about 15:1 by equivalent weight. In certain embodiments, the isocyante curing agent and the sulfur-containing epoxy functional polyol are used in amounts suitable to provide an isocyanate to hydroxyl ratio of about 5:95 to about 95:5 by weight percentage. For example, in some embodiments, the isocyante curing agent and the sulfur-containing epoxy functional polyol are used in amounts suitable to provide an isocyanate to hydroxyl ratio of about 30 to 70 or greater by weight percentage. In some exemplary embodiments, the isocyante curing agent and the sulfur-containing epoxy functional polyol are used in amounts suitable to provide an isocyanate to hydroxyl ratio of about 70:30 by weight percentage.

ADDITIONAL ADDITIVES

Compositions of the present invention can also optionally include other standard additives, such as colorants; fillers; adhesion promoters; plasticizers; thixotropes; retardants; catalysts; corrosion resistant pigments; and masking agents. Thixotropes, for example, fumed silica or carbon black, can be used in an amount from about 0.1 to about 5 weight percent based upon total weight of the composition.

Fillers useful in the present compositions, especially for aerospace or aviation applications, include those commonly used in the art, such as carbon black, calcium carbonate ($CaCO_3$), silica, nylon and the like. In one embodiment, the compositions include about 5 to about 70 weight percent of the selected filler or combination of fillers, such as about 10 to 50 weight percent based upon the total weight of the composition.

In certain embodiments, the compositions of the present invention include a colorant. As used herein, the term "colorant" means any substance that imparts color and/or other opacity and/or other visual effect to the composition. The colorant can be added to the coating composition in any suitable form, such as discrete particles, dispersions, solutions and/or flakes. A single colorant or a mixture of two or more colorants can be used in the coatings of the present invention.

Nonlimiting examples of colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

In some embodiments, the pigment may be an anti-corrosion pigment such as a chromate or non-chromate corrosion inhibitor. "Anti-corrosion pigments" as used herein refers to particles that, when included in a coating composition that is deposited upon a substrate, act to provide a coating that minimizes or, in some cases, even prevents, the alteration or degradation of the substrate, such as by a chemical or electrochemical oxidizing process, including rust in iron containing substrates and degradative oxides in aluminum substrates. "Chromate" and the like terms refer to any compound comprising chromium or derivatives thereof. Nonlimiting examples of suitable chromate corrosion inhibitors include strontium chromate, barium chromate, zinc chromate, and calcium chromate.

In certain embodiments, the corrosion resisting particles comprise an inorganic oxide, in some embodiments a plurality of inorganic oxides. Nonlimiting examples of suitable inorganic oxides include zinc oxide (ZnO), magnesium oxide (MgO), ceryllium oxide ($CeO_2$), molybdenum oxide ($MoO_3$), and/or silicon oxide ($SiO_2$) among others. As used herein, the term "plurality" means two or more. Therefore, certain embodiments of coating compositions of the present invention include corrosion resisting particles comprising two, three, four, or more than four inorganic oxides. In certain embodiments, these inorganic oxides are present in such particles, for example, in the form of a homogeneous mixture or a solid-state solution of the plurality of oxides.

In some exemplary embodiments, the corrosion resisting particles including the inorganic oxide(s) include an oxide of zinc, cerium, yttrium, manganese, magnesium, molybdenum, lithium, aluminum, tin, and/or calcium. In certain embodiments, the particles also include an oxide of boron, phosphorus, silicon, zirconium, iron, and/or titanium. In some embodiments, the particles include silicon dioxide.

In some embodiments, the corrosion resisting particles comprise a plurality of inorganic oxides selected from (i) particles comprising an oxide of cerium, zinc and silicon; (ii) particles comprising an oxide of calcium, zinc and silicon; (iii) particles comprising an oxide of phosphorus, zinc and silicon; (iv) particles comprising an oxide of yttrium, zinc and silicon; (v) particles comprising an oxide of molybdenum, zinc and silicon; (vi) particles comprising an oxide of boron, zinc and silicon; (vii) particles comprising an oxide of cerium, aluminum and silicon; (viii) particles comprising an oxide of magnesium or tin and silicon; (ix) particles comprising an oxide of cerium, boron and silicon, or a mixture of two or more of particles (i) to (ix). Additional corrosion resisting particles suitable for use with the present coating composition are described in U.S. Pat. No. 7,569,163 to Tang, et al., titled "Polythioether Amine Resins and Compositions Comprising the Same," the entire content of which is incorporated herein by reference.

Example dyes include, but are not limited to, those that are solvent and/or aqueous based such as phthalo green or blue, iron oxide, bismuth vanadate, anthraquinone, perylene, aluminum and quinacridone.

Example special effect compositions that may be used in the compositions of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086, the entire contents of which are incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In general, the colorant can be present in any amount sufficient to impart the desired visual and/or color effect. The colorant may include from 1 to 65 weight percent of the present compositions, such as from 3 to 40 weight percent or 5 to 35 weight percent, with weight percent based on the total weight of the compositions.

The following examples illustrate exemplary embodiments of the invention. However, the examples are provided for illustrative purposes only, and do not limit the scope of the invention. Unless otherwise indicated, all parts and percentages in the following examples, as well as throughout the specification, are by weight.

EXAMPLES

Example 1

Synthesis of Polythioether Containing Polyol

A reaction between an epoxy resin (Epon 1001F) and a mercaptan terminated polythioether (Permapol P-3.1E) was carried out at 125-130° C. The Epoxy equivalent to mercaptan equivalent ratio was about 3.5:1.0. The amounts of each reactant are listed in Table 1 below. The reaction was monitored by mercaptan equivalent titration, and a high mercaptan equivalent weight indicated the completion of the reaction. A polythioether containing polyol solution was obtained with the following properties: NVM: 70.0%, weight per gallon (WPG): 8.96 lb/gal, OH Equivalent Weight (Theory): 1141 at 70% NVM, Mercaptan Equivalent Weight: 1,803,917 at 70% NVM.

TABLE 1

Preparation of Sulfur-Containing Epoxy Functional Polyol

| Component | Description | Manufacturer | Example 1 Weight (g) |
|---|---|---|---|
| Epon 1001F | Epoxy resin | Hexion Specialty Chemicals | 330.79 |
| Permapol P-3.1E | Mercaptan terminated polythioether | PRC-Desoto International Inc. | 316.01 |
| Thioplast G-1 | Mercaptan terminated polysulfide | Akzo Nobel Functional Chemicals LLC | 0.00 |
| Dowanol PMA | Solvent | Dow Chemical Co. | 138.60 |
| Methyl Ethyl Ketone | Solvent | Dow Chemical Co. | 138.60 |
| Total | | | 924.00 |

Example 2

Synthesis of Polysulfide Containing Polyol

A reaction between an epoxy resin (Epon 1001F) and the mercaptan terminated polysulfide Thioplast G-1 was carried out at 125-130° C. The epoxy equivalent to mercaptan equivalent ratio was 3.5:1.0. The amounts of the reactants are listed in Table 2 below. The reaction was monitored with mercaptan equivalent titration, and a high mercaptan equivalent weight indicated the completion of the reaction. A polysulfide containing polyol solution was obtained with the following properties: NVM: 70.0%, WPG: 8.96 lb/gal, OH Equivalent Weight (Theory): 1141 at 70% NVM, mercaptan equivalent weight: 1,283,800 at 70% NVM.

TABLE 2

Preparation of Sulfur-Containing Epoxy Functional Polyol

| Component | Description | Manufacturer | Example 2 Weight (g) |
|---|---|---|---|
| Epon 1001F | Epoxy resin | Hexion Specialty Chemicals | 330.79 |
| Permapol P-3.1E | Mercaptan terminated polythioether | PRC-Desoto International Inc. | 0.00 |
| Thioplast G-1 | Mercaptan terminated polysulfide | Akzo Nobel Functional Chemicals LLC | 316.01 |
| Dowanol PMA | Solvent | Dow Chemical Co. | 138.60 |
| Methyl Ethyl Ketone | Solvent | Dow Chemical Co. | 138.60 |
| Total | | | 924.00 |

Example 3

Polythioether Coating Formulation

The sulfur-containing, epoxy functional polyol prepared according to Example 1 was used to prepare a coating composition. The amounts of the sulfur-containing, epoxy functional polyol and other components of the coating composition are listed in Table 3.

TABLE 3

Preparation of DIEGME Resistant Fuel Tank Coatings

| Raw material | Description | Manufacturer | Example 3 Weight (g) |
|---|---|---|---|
| Base component | | | |
| Example 1 | Polythioether containing polyol | Manufactured as described in Example 1 | 22.91 |
| Methyl Ethyl Ketone | Solvent | Dow Chemical Co. | 18.19 |
| Dowanol PMA | Solvent | Dow Chemical Co. | 12.06 |
| 2,4-Pentanedione | Solvent | Dow Chemical Co. | 2.89 |
| Silquest A-187 | Silane additive | Momentive Performance Materials | 1.99 |
| Dibutylin dilaurate | Tin catalyst | Sigma-Aldrich | 0.10 |
| Corrosperse 176X | Strontium chromate dispersion | Wayne pigment | 9.97 |
| Ti-Pure R-706 | Titanium dioxide | Dupont | 9.97 |
| Talcron MP-44-26 | Magnesium silicate hydrate | Barretts Minerals | 6.98 |
| Nicron 504 | Talc | Luzenac America | 14.95 |
| Sub-Total 1 | | | 100.00 |
| Activator Component | | | |
| Polymerica MDI | Polyisocyanate | Bayer Materialscience LLC | 40.32 |
| Methyl Ethyl Ketone | Solvent | Dow Chemical Co. | 4.68 |
| Sub-Total 2 | | | 45.00 |

Example 4

Polysulfide Coating Formulation

The sulfur-containing, epoxy functional polyol prepared according to Example 2 was used to prepare a coating composition. The amounts of the sulfur-containing, epoxy functional polyol and other components of the coating composition are listed in Table 4.

TABLE 4

Preparation of DIEGME Resistant Fuel Tank Coatings

| Raw material | Description | Manufacturer | Example 4 Weight (g) |
|---|---|---|---|
| Base component | | | |
| Example 2 | Polysulfide containing polyol | Manufactured as described in Example 2 | 22.91 |
| Methyl Ethyl Ketone | Solvent | Dow Chemical Co. | 18.19 |
| Dowanol PMA | Solvent | Dow Chemical Co. | 12.06 |
| 2,4-Pentanedione | Solvent | Dow Chemical Co. | 2.89 |
| Silquest A-187 | Silane additive | Momentive Performance Materials | 1.99 |
| Dibutylin dilaurate | Tin catalyst | Sigma-Aldrich | 0.10 |
| Corrosperse 176X | Strontium chromate dispersion | Wayne pigment | 9.97 |
| Ti-Pure R-706 | Titanium dioxide | Dupont | 9.97 |
| Talcron MP-44-26 | Magnesium silicate hydrate | Barretts Minerals | 6.98 |
| Nicron 504 | Talc | Luzenac America | 14.95 |
| Sub-Total 1 | | | 100.00 |
| Activator Component | | | |
| Polymerica MDI | Polyisocyanate | Bayer Materialscience LLC | 40.32 |
| Methyl Ethyl Ketone | Solvent | Dow Chemical Co. | 4.68 |
| Sub-Total 2 | | | 45.00 |

Testing Methods

Fully cured coating compositions according to the above examples were tested using the following methods. Each coating composition was sprayed to a dry film thickness of 1.0 mil (25 μm) on both sides of an aluminum panel made from Alodine 1200 treated aluminum alloy (Aerospace Material Specification (AMS) 2024-T3). The coating compositions were cured at ambient temperature at least two weeks before testing. Detailed testing results are listed in Table 5.

Solvent Resistance

Solvent resistance of each coating composition was tested in accordance with American Society for Testing and Materials (ASTM) D5402 (Standard Practice for Assessing the Solvent Resistance of Organic Coatings Using Solvent Rubs). The cured coating compositions were rubbed back and forth 50 times with firm finger pressure with cheesecloth that was soaked in methyl ethyl ketone (MEK) solvent. Rubbing through the coating composition to the substrate would indicate a failure of the coating composition due to insufficient cure. Both the coating composition and the cloth were visually examined for any coating removal.

Crosshatch Adhesion

Crosshatch adhesion of each coating composition was determined in accordance with ASTM D3359 (Standard Test Methods for Measuring Adhesion by Tape Test; Method B). A crosshatch pattern was scribed through each coating composition down to the substrate. A strip of 1 inch wide masking tape, such as 3M 250 or equivalent, was applied. The tape was pressed down using two passes of a 4.5-pound rubber covered roller. The tape was removed in one abrupt motion perpendicular to the panel. The adhesion was rated by a visual examination of the paint at the crosshatch area using the ASTM provided rating system.

Pencil Hardness

Pencil hardness of each coating composition was determined in accordance with ASTM D3363 (Standard Test Method for Film Hardness by Pencil Test). Hardness of each coating composition was determined relative to a standard set of pencil leads by scratching the leads across the coating at a 45 degree angle for about one-quarter of an inch. The process was repeated until a lead was identified that did not scratch the film. The number of the lead was recorded as the hardness.

Low Temperature Flexibility Measured with Flexibility Jig

The low temperature flexibility of each coating composition was measured with a jig according to the procedure described in AMS C-27725C, Section 4.6.5.13. Coated panels and the flexibility jig were subjected to a temperature of −65° F. (−54° C.) for 2 hours. While at this temperature, one panel end was held in the slotted position and the other end of the panel was bent rapidly around the curved position of the jig, with the coating composition located on the side of the panel opposite to the curved position of the jig (i.e., the convex side of the panel). The panel was then removed from the jig and the test was repeated for additional panels. The test panels were removed and examined for any cracking, checking, crazing or loss of adhesion.

Low Temperature Flexibility Measured with Cylindrical Mandrel Tester

The low temperature flexibility of each coating composition was measured with a cylindrical mandrel tester (3/16 inch) according to the procedure described in ASTM D522 (Standard Test Methods for Mandrel Bend Test of Attached Organic Coatings; Method B). Coated panels and the Mandrel Tester were subjected to a temperature of −65° F. (−54° C.) for 2 hours. While at this temperature, the test panel was placed over a mandrel with the uncoated side in contact with the mandrel and with at least 2 inches overhang on either side. Using a steady finger pressure, each panel was bent approximately 180 degrees around the mandrel at a uniform velocity. The test panels were removed and immediately examined for any cracking, or loss of adhesion.

Simulated Microbial Byproducts Resistance

The simulated microbial byproducts resistance of each coating composition was measured according to the procedure described in AMS-C-27725C, Section 4.6.5.19. For this test, an acetic acid-salt solution was prepared by dissolving five parts by weight of analytical grade glacial acetic acid in 100 parts by weight of 3 percent sodium chloride in distilled water. Each coated panel was immersed vertically for 5 days at 140° F. (60° C.), exposing one-third of the panel to the acetic acid-salt solution, one-third to a jet reference fluid and one-third to a mixture of air and the vapor from the acetic acid-salt solution. The panels were removed, rinsed gently in running tap water and carefully blotted dry. The test panels were visually examined for any blistering, cracking, leaching, shrinkage or loss of adhesion. The panels were then immediately scribed with two parallel scratches in each of the three areas: the acid-salt solution, the jet reference fluid, and the air-vapor mixture area. The scratches were made all the way through the coating composition to the substrate. In each of the three areas, the two parallel scratches were scribed 1 inch apart. Strips of 1 inch wide masking tape, such as 3M 250 or equivalent, were applied to the 1 inch wide areas between each set of two parallel scratches. Each strip of tape was pressed down using two passes of a 4.5-pound rubber covered roller. The tape was removed in one abrupt motion perpendicular to the panel. A more than 5 percent removal of the coating composition from the substrate would indicate a failure of the coating composition.

DIEGME Resistance

The DIEGME resistance of each of the coating compositions was tested in the following manner. Each coating composition was sprayed on both sides of a panel and cured under ambient conditions. Each cured coating composition was tested for initial pencil hardness prior to DIEGME exposure. Next, the coated panels were placed vertically in a closed glass container containing a mixture of 80% by weight of DIEGME and 20% by weight of distilled water. One half of each panel was immersed in the mixture of DIEGME and water. The glass container was sealed and exposed to a constant temperature of 170° F. (77° C.) for 6 weeks. At the end of 6 weeks, the panels were removed from the fluid mixture, cooled to ambient temperature, rinsed with water, wiped dry and tested for pencil hardness within 10 minutes of removal from the solution. The test panels were visually examined for any blistering, or loss of adhesion. Pencil hardness and crosshatch adhesion were determined as described above.

TABLE 5

Properties of the Formulated Coating Composition

| Test Results | | Example 3 | Example 4 |
|---|---|---|---|
| Solvent Resistance | | Pass | Pass |
| Crosshatch Adhesion | | 5 B | 4 B |
| Low Temperature Flexibility Jig Test | | Pass | Pass |
| Low Temperature Flexibility Cylindrical Mandrel Test | | 3/16 Inch, Pass | 3/16 Inch, Pass |
| Simulated Microbial Byproducts Test | | No blistering or adhesion failure in any of the three areas, Pass | No blistering or adhesion failure in any of the three areas, Pass |
| DIEGME Resistance Test | | | |
| Pencil Hardness, Initial | | 2 H | 2 H |
| 6 Weeks Exposure, Immersed Part, 80/20 DIEGME/water | Appearance | No blistering or adhesion loss, Pass | No blistering or adhesion loss, Pass |
| | Pencil Hardness | HB | HB |
| | Crosshatch Adhesion | 4 B | 4 B |

TABLE 5-continued

Properties of the Formulated Coating Composition

| Test Results | | Example 3 | Example 4 |
|---|---|---|---|
| 6 Weeks Exposure, Vapor Part | Appearance | No blistering or adhesion loss, Pass | No blistering or adhesion loss, Pass |
| | Pencil Hardness | F | F |
| | Crosshatch Adhesion | 4 B, Pass | 1 B, Failed |

As shown in Table 5, above, Examples 3 and 4 demonstrated excellent solvent resistance, adhesion, low temperature flexibility and DIEGME resistance. As also shown, the coating composition including an epoxy functional polythioether polyol exhibited better DIEGME vapor resistance than the coating composition including an epoxy functional polysulfide polyol. However, the DIEGME resistance test was performed in a DIEGME solution (80% DIEGME and 20% water) at elevated temperature (i.e., 170° F.). The heat resistance of the polythioether backbone is better than that of the polysulfide backbone. Accordingly, when subjected to long term exposure to the DIEGME solution at the elevated temperature, the polythioether backbone embodiments show better long term DIEGME resistance than the polysulfide backbone embodiments. The polysulfide backbone embodiments and the polythioether backbone embodiments, though, both exhibit DIEGME resistance at lower temperatures and/or over shorter periods of exposure at the elevated temperatures.

In contrast, conventional polyurethane coatings are not DIEGME resistant, as is well known. Indeed, the development of DIEGME resistant coatings has presented a significant challenge thus far, as discussed in Aliband, et al., "Epoxy paint failure in B-52 fuel tanks: Part 1-Preliminary development of a model for the process," *Progress in Organic Coatings*, 56, pgs. 285-296 (2006), and Aliband, et al., "Epoxy paint failure in B-52 fuel tanks: Part II—Influence of DIEGME concentration in the fuel on the failure process," *Progress in Organic Coatings*, 63, pgs. 139-147 (2008), the entire contents of which are incorporated herein by reference.

The present invention has been described with reference to exemplary embodiments and aspects, but is not limited thereto. Persons skilled in the art will appreciate that other modifications and applications can be made without meaningfully departing from the invention. For example, although the coating compositions are described as being useful for aerospace or aviation fuel tank applications, they may be useful for other applications as well. Accordingly, the foregoing description should not be read as limited to the precise embodiments and aspects described, but should be read consistent with and as support for the following claims, which are to have their fullest and fairest scope.

Throughout the text and the claims, use of the word "about" in relation to a range of values is intended to modify both the high and low values recited, and reflects the penumbra of variation associated with measurement, significant figures, and interchangeability, all as understood by a person having ordinary skill in the art to which this invention pertains.

What is claimed is:

1. A coating composition comprising:
   a) a sulfur-containing, epoxy functional polyol, wherein the sulfur-containing, epoxy functional polyol comprises a compound represented by Formula (7):

Formula 7

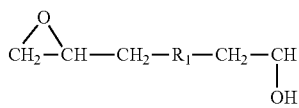 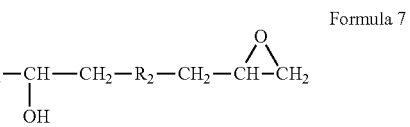

$$CH_2-CH-CH_2-R_1-CH_2-CH-CH_2-S-Z-[S-R_3-S-Z]_m-S-CH_2-CH-CH_2-R_2-CH_2-CH-CH_2$$
with OH groups on the indicated carbons and epoxide rings at the terminal CH$_2$—CH positions wherein Z comprises a polythioether or polysulfide linkage;
$R_3$ comprises an alkyl group or an aromatic group or a combination thereof, and comprises at least two hydroxyl functional groups;
m is an integer ranging from 1 to 4; and
each of $R_1$ and $R_2$ is independently an alkyl group or an aromatic group or a combination thereof; and
b) an isocyanate curing agent;
wherein an isocyanate to hydroxyl ratio of the coating composition is from 15:1 to 20:1 by equivalent weight.

2. The coating composition of claim 1, wherein the sulfur-containing, epoxy functional polyol comprises a reaction product of reactants comprising a mercaptan terminated polymer and an epoxy resin.

3. The coating composition of claim 2, wherein the mercaptan terminated polymer comprises a mercaptan terminated polysulfide or a mercaptan terminated polythioether.

4. The coating composition of claim 2, wherein the mercaptan terminated polymer comprises a mercaptan terminated polythioether represented by Formula 1:

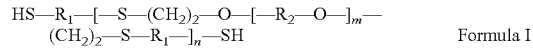

HS—$R_1$—[—S—(CH$_2$)$_2$—O—[—$R_2$—O—]$_m$—(CH$_2$)$_2$—S—$R_1$—]$_n$—SH     Formula I wherein
$R_1$ denotes a $C_{2-6}$ n-alkylene, $C_{3-6}$ branched alkylene, $C_{6-8}$ cycloalkylene or $C_{6-10}$ alkylcycloalkylene group, or —[(—CH$_2$—)$_p$—X—]$_q$—(—CH$_2$—)$_r$— in which at least one —CH$_2$— unit is substituted with a methyl group,
$R_2$ denotes a methylene, $C_{2-6}$ n-alkylene, $C_{2-6}$ branched alkylene, $C_{6-8}$ cycloalkylene or $C_{6-10}$ alkylcycloalkylene group, or —[(—CH$_2$—)$_p$—X—]$_q$—(—CH$_2$—)$_r$— in which at least one —CH$_2$— is substituted with a methyl group,
X is one selected from the group consisting of O, S and —NR$_6$—,
$R_6$ denotes H or methyl,
m is a rational number from 0 to 10,
n is an integer from 1 to 60,
p is an integer from 2 to 6,
q is an integer from 1 to 5, and
r is an integer from 2 to 10.

5. The coating composition of claim 2, wherein the mercaptan terminated polymer comprises a mercaptan terminated polysulfide represented by Formula 4:

HS—(R—SS)$_n$—R—SH      Formula 4 wherein R is a linear or branched hydrocarbon, oxahydrocarbon, or thiahydrocarbon, and n is an integer from 7 to 38.

6. The coating composition of claim 2, wherein the epoxy resin comprises a compound represented by Formula 5:

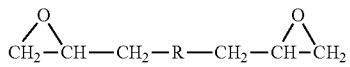

Formula 5 wherein R is an aliphatic group, a cycloaliphatic group, an aromatic group, or a combination thereof.

7. The coating composition of claim 6, wherein R is represented by Formula 6:

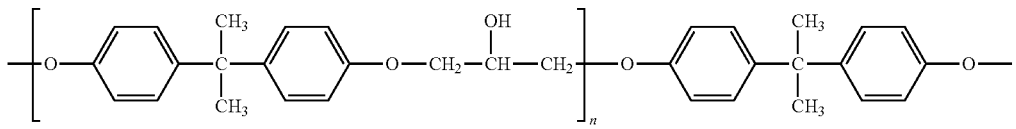

Formula 6 wherein n is an integer ranging from 1 to 10.

8. The coating composition of claim 1, wherein the sulfur-containing, epoxy functional polyol has a weight average molecular weight of about 10,000 or less.

9. A coating composition comprising:
a) a sulfur-containing, epoxy functional polyol; and
b) an isocyanate curing agent;
wherein the coating composition has an isocyanate to hydroxyl ratio from 15:1 to 20:1 by equivalent weight.

10. The coating composition of claim 1, wherein the isocyanate curing agent comprises an isocyanate represented by NCO—R' or an isocyanate represented by NCO—R"—NCO or a combination thereof, wherein each of R' and R" independently comprises an alkyl group or an aromatic group or a combination thereof.

11. The coating composition of any of claim 1, wherein the isocyanate curing agent comprises an isocyanate functional group, and upon curing the coating composition at least one isocyanate functional group reacts with moisture to form at least one urea functional group.

12. The coating composition of claim 1, wherein upon cure the isocyanate curing agent cross-links the sulfur-containing, epoxy functional polyol to form an epoxy functional polyurethane compound.

13. The coating composition of claim 1, wherein Z comprises a polythioether linkage represented by Formula 8:

—S—R$_1$—[—S—(CH$_2$)$_2$—O—[—R$_2$—O—]$_m$— (CH$_2$)$_2$—S—R$_1$—]$_n$—S—      Formula 8 wherein
R$_1$ denotes a C$_{2-6}$ n-alkylene, C$_{3-6}$ branched alkylene, C$_{6-8}$ cycloalkylene or C$_{6-10}$ alkylcycloalkylene group, or —[(—CH$_2$—)$_p$—X—]$_q$—(—CH$_2$—)$_r$— in which at least one —CH$_2$— unit is substituted with a methyl group,
R$_2$ denotes a methylene, C$_{2-6}$ n-alkylene, C$_{2-6}$ branched alkylene, C$_{6-8}$ cycloalkylene or C$_{6-10}$ alkylcycloalkylene group, or —[(—CH$_2$—)$_p$—X—]$_q$—(—CH$_2$—)$_r$— in which at least one —CH$_2$— is substituted with a methyl group, X is one selected from the group consisting of O, S and —NR$_6$—, R$_6$ denotes H or methyl, m is a rational number from 0 to 10, n is an integer from 1 to 60, p is an integer from 2 to 6, q is an integer from 1 to 5, and r is an integer from 2 to 10.

14. A coating composition comprising:
a) a compound represented by Formula 7:

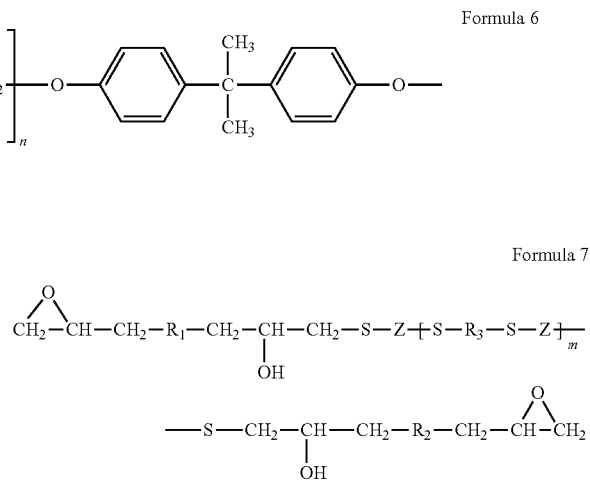

Formula 7 wherein,
each of R$_1$ and R$_2$ independently comprise an alkyl group or an aromatic group or a combination thereof;
R$_3$ comprises an alkyl group or an aromatic group or a combination thereof, and comprises at least two hydroxyl functional groups;
m is an integer ranging from 0 to 4; and
Z comprises a polythioether or polysulfide linkage; and
b) an isocyanate curing agent;
wherein the coating composition has an isocyanate to hydroxyl ratio from 15:1 to 20:1 by equivalent weight.

15. The coating composition of claim 1, wherein R$_3$ is derived from an epoxy resin comprising a polyglycidyl ether or a polyhydric phenol.

16. The coating composition of claim 1, wherein R$_3$ is derived from an epoxy resin represented by Formula 5:

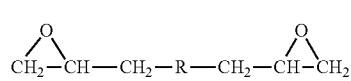

Formula 5 wherein R is an aliphatic group, a cycloaliphatic group, an aromatic group, or a combination thereof.

17. The coating composition of claim 16, wherein R is represented by Formula 6:

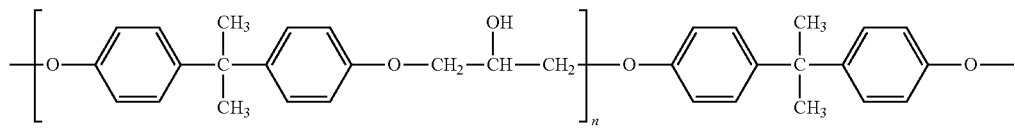

Formula 6 wherein n is an integer ranging from 1 to 10.

18. The coating composition of claim 1, wherein an isocyanate to hydroxyl ratio of the coating composition is from 3:1 to 20:1 by equivalent weight.

19. The coating composition of claim 1, formulated as a coating.

20. A coating formed from the coating composition of claim 19.

21. A method of coating a surface, comprising:
applying the coating composition of claim 19 to a surface; and
curing the coating composition to provide a coating.

22. The coating composition of claim 4, wherein,
each $R_1$ is $-[(-CH_2-)_p-O-]_q-(-CH_2-)_r-$;
$R_2$ is $C_{2-6}$ n-alkylene; and
m is 1 to 4.

23. The coating composition of claim 4, wherein,
each $R_1$ is $-[(-CH_2-)_p-O-]_q-(-CH_2-)_r-$, wherein each of p, q, and r is 2;
$R_2$ is ethylene; and
m is 2.

24. The coating composition of claim 23, wherein the average mercaptan functionality from 2.1 to 2.6.

25. The coating composition of claim 13, wherein,
each $R_1$ is $-[(-CH_2-)_p-O-]_q-(-CH_2-)_r-$;
$R_2$ is $C_{2-6}$ n-alkylene; and
m is 1 to 4.

26. The coating composition of claim 13, wherein,
each $R_1$ is $-[(-CH_2-)_p-O-]_q-(-CH_2-)_r-$, wherein each of p, q, and r is 2;
$R_2$ is ethylene; and
m is 2.

27. The coating composition of claim 26, wherein the average mercaptan functionality from 2.1 to 2.6.

* * * * *